United States Patent [19]
Walsh et al.

[11] Patent Number: 5,345,405
[45] Date of Patent: Sep. 6, 1994

[54] CIRCUIT FOR DETECTING THE POSITION OF AN EXTREME "1" BIT IN A BINARY NUMBER

[75] Inventors: Brendan Walsh; Richard Simpson, both of Bedford; Laura Dudbridge, Oxford; David Collins; Philip Moyse, both of Bedford, all of England

[73] Assignee: Texas Instruments Incorporated, Dallas, Tex.

[21] Appl. No.: 978,005

[22] Filed: Nov. 18, 1992

[30] Foreign Application Priority Data

Nov. 19, 1991 [GB] United Kingdom ............... 9124539.9

[51] Int. Cl.$^5$ .................................................. G06F 7/00
[52] U.S. Cl. .................................................. 364/715.1
[58] Field of Search .......................... 364/715.09–715.1

[56] References Cited
U.S. PATENT DOCUMENTS 3,678,259  7/1972  Kyser ............................ 364/715.1
4,760,551  7/1985  Yokomizo et al. ................. 364/748
4,785,421  11/1988  Takahashi et al. .......... 364/715.1 X
5,091,874  2/1992  Watanabe et al. ............... 364/715.1

FOREIGN PATENT DOCUMENTS 1126810  9/1968  United Kingdom .

*Primary Examiner*—Tan V. Mai
*Attorney, Agent, or Firm*—William E. Hiller; Richard L. Donaldson

[57] ABSTRACT

Apparatus for detecting the leftmost "1" bit or the rightmost "1" bit of an input number includes a binary tree (11) of two-inputs OR-gates (13, 14, 15, 16) or their logical equivalent to which the input number is applied in parallel and from which signals are derived and applied as inputs and to control a plurality of trees (MA, MB, MC) of two-input multiplexers (12) from the outputs (E0, E1, E2, E3) of which appear the bits of a number representing the position in the input number of the leftmost "1" or the rightmost "1" bit.

9 Claims, 4 Drawing Sheets

Fig.2.

| E3 | E2 | E1 | E0 |     |
|----|----|----|----|-----|
| 1  | 1  | 1  | 1  | A15 |
| 1  | 1  | 1  | 0  | A14 |
| 1  | 1  | 0  | 1  | A13 |
| 1  | 1  | 0  | 0  | A12 |
| 1  | 0  | 1  | 1  | A11 |
| 1  | 0  | 1  | 0  | A10 |
| 1  | 0  | 0  | 1  | A9  |
| 1  | 0  | 0  | 0  | A8  |
| 0  | 1  | 1  | 1  | A7  |
| 0  | 1  | 1  | 0  | A6  |
| 0  | 1  | 0  | 1  | A5  |
| 0  | 1  | 0  | 0  | A4  |
| 0  | 0  | 1  | 1  | A3  |
| 0  | 0  | 1  | 0  | A2  |
| 0  | 0  | 0  | 1  | A1  |
| 0  | 0  | 0  | 0  | A0  |

Fig.3.

| OUTPUT OF THIRD STAGE | OUTPUT OF SECOND STAGE | OUTPUT OF FIRST STAGE | INPUT |
|---|---|---|---|
| D1 | C3 | B7 | A15 |
|    |    |    | A14 |
|    |    | B6 | A13 |
|    |    |    | A12 |
|    | C2 | B5 | A11 |
|    |    |    | A10 |
|    |    | B4 | A9  |
|    |    |    | A8  |
| D0 | C1 | B3 | A7  |
|    |    |    | A6  |
|    |    | B2 | A5  |
|    |    |    | A4  |
|    | C0 | B1 | A3  |
|    |    |    | A2  |
|    |    | B0 | A1  |
|    |    |    | A0  |

CIRCUIT FOR DETECTING THE POSITION OF AN EXTREME "1" BIT IN A BINARY NUMBER

The present invention relates to circuits for detecting in a binary number the position of an extreme "1" bit and producing an output representing that position.

In microprocessors and other forms of digital circuitry it is often required to determine where is the most significant "1" bit or where is the least significant "1" bit.

An example of such a requirement comes from floating point numbers represented as a mantissa and exponent. This representation is redundant in that equivalent representations are obtained by incrementing the exponent by unity and dividing the mantissa by two or decrementing the exponent by unity and multiplying the exponent by two. It is desirable in multiplication and division, for example, to obtain the representation with the most significant "1" in the mantissa in a particular position in the mantissa. To work out the required adjustment it is helpful to know the current position of the most significant "1" in the mantissa.

One solution to the problem of finding extreme "1" bits in a binary number is to place the number in a shift register, to shift the number a bit at a time until a "1" appears in the end stage of the register, and to count the number of shifts. The number of shifts required depends on the initial position of the extreme "1" bit.

The disadvantages with the shift register solution are that it is slow because it requires a number of operations to be repeated and that the time required varies with the value of the number so that an exact time allowance cannot be made.

It is an object of the present invention to provide an improved circuit for detecting in a binary number the position of an extreme "1" bit.

According to the present invention there is provided apparatus for detecting the "1" bit of an input binary number of n-bits having an extreme position in that number and for producing an output representing that position, the apparatus including a binary tree of two-input OR-gate means having m stages, where $2^m \geq n$, with or without the final stage of the tree containing a single OR-gate means, and having a first stage with up to $2^{m-1}$ OR-gate means to the inputs of which the bits of the input number are respectively applied, and a multiplexer circuit having m-2 multiplexer trees selectively responsive to inputs to and outputs from the stages of the binary tree to produce respective output bits which in combination with an output from the penultimate stage of the binary tree form a binary number representing the position of the extreme "1" bit in the input number.

The OR-gate means may be OR-gates or any suitable combination of logical elements that produces the same logical result. In a particular example of the apparatus to be described two OR-gate means of one stage of the tree and one OR-gate means of the next stage are provided by two two-input NOR-gates having their outputs connected to one two-input NAND-gate. The output of one of the NOR-gates is also applied to an inverter to provide an erect output.

The multiplexer trees may each comprise one or more two-input multiplexers. The inputs to the multiplexers forming the first stage of each tree may be connected to receive the same handed ones of the input signals, taken in pairs, to a corresponding stage of the binary tree of OR-gate means. The control signals for the multiplexers in each stage of each tree are derived from the same handed ones of the outputs, taken in pairs, of the OR-gate means in a corresponding stage of the binary tree of OR-gate means.

Examples of apparatus for detecting the position of an extreme "1" bit in a binary number will be now described with reference to the accompanying drawings, of which:

FIG. 2 is a table of output codes for different positions of the leftmost "1" bit of an input number produced by the apparatus of FIG. 1;

FIG. 3 is a table of the signals in the apparatus of FIG. 1;

FIG. 1 is a diagram of one example of a circuit of apparatus for detecting an extreme "1" bit in an input number having 16 bits.

Figure 1:
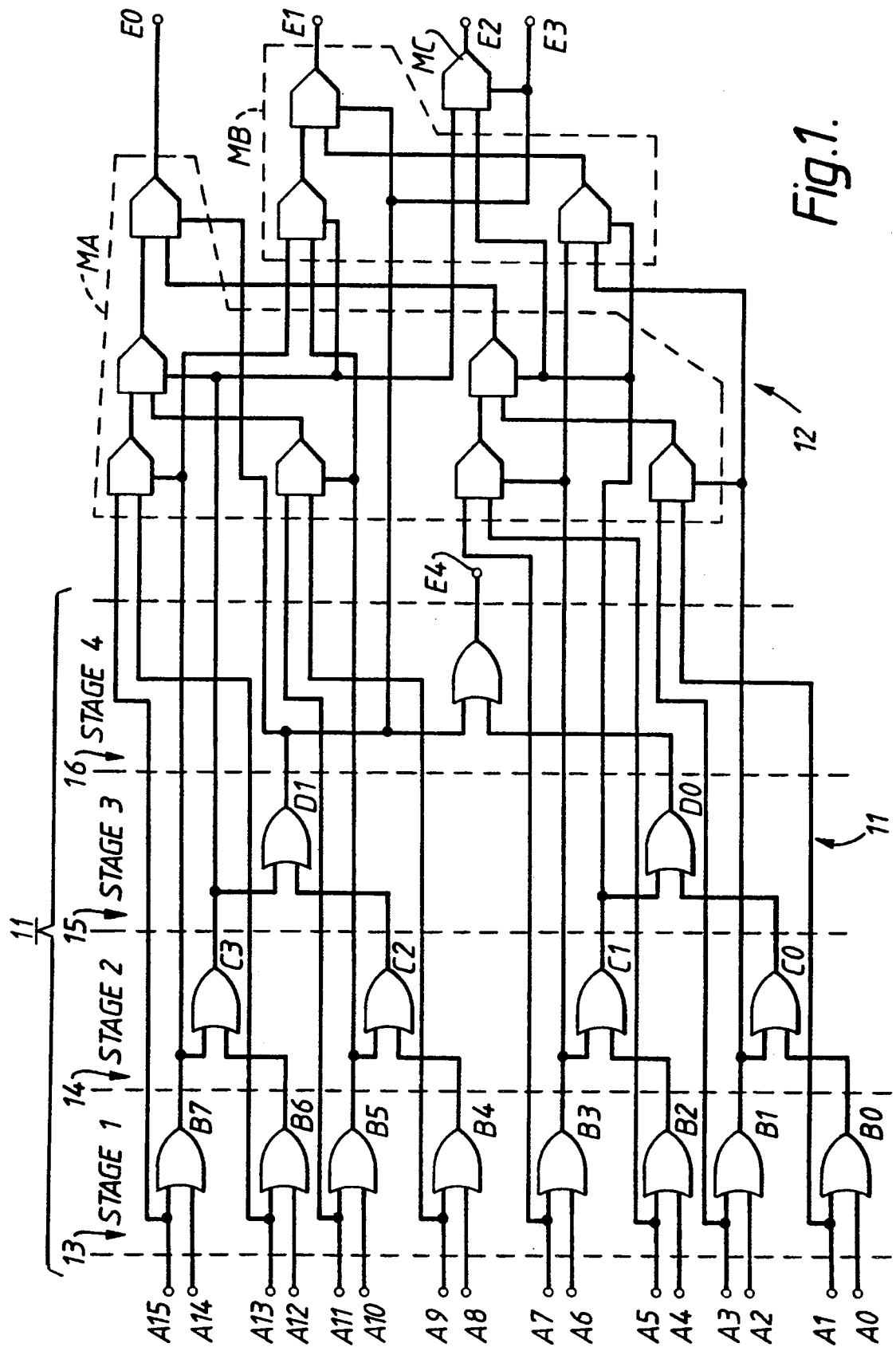
FIG. 1 is a diagram of one example of the apparatus.

The circuit has input terminals A0 ... A15 for a 16-bit parallel input number and output terminals E0 ... E3 for a 4-bit parallel output number. A flag output E4 is provided to indicate when a "1" bit is applied to any one of the input terminals A0 ... A15. The apparatus comprises a binary tree 11 of two input OR-gates and multiplexer circuits 12. The OR-gates are represented by the conventional symbol and the multiplexers by irregular pentagons. The tree 11 of OR-gates has four stages 13, 14, 15 and 16. The first stage 13 comprises eight OR-gates, the sixteen inputs of which are respectively connected to the input terminals A0 ... A15 in order. The outputs B0 ... B7 of the eight OR-gates of the first stage 13 form the inputs to the four two-input OR-gates of the second stage 14 respectively. The outputs C0 ... C3 of the OR-gates of the second stage 14 form the inputs to the two two-input OR-gates of the third stage 15 respectively. The outputs D0,D1 of the OR-gates of the third stage 15 form the inputs to the single two-input OR-gate of the fourth stage 16. The output of the gate of the fourth stage 16 provides the output to the flag output terminal E4.

The multiplexer circuits 12 comprise three separate circuits, each in the form of a binary tree of two-input multiplexers. The three trees of multiplexers have input signals respectively selected from signals A0 to A15, B0 to B7, or C0 to C3 of the OR-gate tree and are controlled by signals selected from B0 to B7, C0 to C3 and D0 and D1.

The particular example shown in FIG. 1 is arranged to produce at the output terminals E0, E1, E2 and E3 a four-bit binary number representing the position of the "1" bit of the input number in the leftmost (or highest place position in the input number). The different output numbers for the different positions of the leftmost "1" bit are shown in the table of FIG. 2. Because the output number represents the position of the leftmost "1" of the input number the connections of the inputs and controls of the multiplexer trees to the signals in the OR-gate tree 11 are selected to be the left-hand ones of the signals, taken in pairs, in the OR-gate tree when viewed from the input end of that tree. The case of the output number representing the position of the rightmost "1" in the input number will be considered later.

The first multiplexer tree is included in the dotted outline MA and has three stages in cascade having four, two and one multiplexer respectively. The eight inputs of the multiplexers of the first stage are respectively connected to the left-hand ones of the input signals A0, . . . , A15 taken in pairs. The four multiplexers of the first stage are respectively controlled by the left-hand ones of the output signals B0, . . . , B7 of the OR-gates of the first stage 13 of the OR-gate tree 11 taken in pairs. The two multiplexers of the second stage receive as inputs the outputs of the four multiplexers of the first stage and are respectively controlled by the left-hand ones of the signals C0, . . . , C3 from the OR-gates of the second stage of the OR-gate tree 11 taken in pairs. The single multiplexer of the third stage receives as inputs the outputs of the multiplexers of the second stage and is controlled by the left-hand one of the signals D0,D1 from the OR-gates of the third stage 14 of the OR-gate tree 11. The output of the single multiplexer of the third stage is connected to the terminal E0.

The second multiplexer tree is included in the dotted outline MB and has two stages in cascade. The first stage has two multiplexers with their inputs respectively connected to receive the left-hand ones of the signals B0, . . . , B7 taken in pairs, and controlled by the left-hand ones of the signals C0, . . . , C3 taken in pairs. The second stage has a single multiplexer receiving as inputs the outputs of the first stage multiplexers and controlled by the left-hand one of the signals D0,D1. The output of the single multiplexer of the third stage is connected to the terminal E1.

The third multiplexer tree consists of a single multiplexer MC which receives as inputs the signals C1 and C3 and is controlled by the signal D1. The output of the multiplexer MC is connected to the terminal E2.

The signal D1 is also applied to the terminal E3.

In operation the circuit of FIG. 1, when presented with a 16-bit binary number at the terminals A0–A15 with the most significant bit at A15, detects the most significant bit equal to "1", that is the leftmost "1" bit, in that number and produces a four-bit code at the outputs E0–E3 identifying the position of that bit. The codes are listed in FIG. 2; for example, if the most significant "1" is at input terminal A7 then the code produced at the output, E3 first, is "0111". The output code is, in fact, the binary representation of the number of the input terminal to which the most significant "1" is applied. In the above example $7_{10}=0111_2$. If there is no "1" in the input number then the flag output E4 is zero and the code at E0–E3 is "0000", otherwise the flag is reset.

The OR-gate tree 11 operates so that if any of the bits on terminals A8 to A15 is a "1" then signal D1 is a "1" and so is the bit output on terminal E3. The multiplexer MC is controlled by the signal D1 so that if any of the bits on terminals A12 to A15 is a "1" then the bit output on E2 is a "1", because D1 is also a "1". The other input to the multiplexer MC is a "1" if any of the bits on terminals A4 to A7 is a "1" but is only transmitted to the terminal E2 if D1 is a "0"; in other words if a bit on the terminals A4 to A7 is the leftmost "1".

The multiplexer tree MB operates in a similar manner to the single multiplexer MC to transmit a "1" to the terminal E1 if and only if the leftmost "1" of the input number is on one of terminals A2, A3, A6, A7, A10, A11, A14 and A15. That is because the tree MB receives as inputs the signals B1, B3, B5 and B7. The control of the individual multiplexers in the tree MB by the signals C1, C3 and D1 ensures that it is only the leftmost "1" that is transmitted to the terminal E1.

In a similar way the multiplexer tree MA transmits a "1" to the terminal E0 if and only if the leftmost "1" of the input number is on one of the terminals A1, A3, A5, A7, A9, A11, A13 and A15.

The circuit of FIG. 1 produces a four-bit output on the terminals E0, E1, E2 and E3 which represents the position of the leftmost "1" bit of the input number applied to the input terminals A0, . . . , A15. The circuit is easily modified so that the output represents the position of the rightmost "1" of the input number. Viewing FIG. 1 from the input terminal side reveals that all of the connections to the OR-gate tree 11 from which signals are applied to the multiplexer trees MA, MB, MC are on the left-hand side of the particular stage taking the signals in pairs. For example, of the input terminals A0, . . . , A15 only terminals A1, A3, A5, A7, A9, A11, A13 and A15 are connected to inputs of the multiplexer tree MA. Similarly, the control signals for the multiplexer tree MA are B1, B3, B5 and B7, C1 and C3, and D1. The modifications of FIG. 1 in order to cause it to produce at the terminals E0, E1, E2 and E3 the number of the input terminals at which the rightmost "1" bit is applied are to change over the connections to the OR-gate tree 11 to the right-hand ones of the relevant pairs. In that case the multiplexer tree MA receives input signals from terminals A0, A2, A4, A6, A8, A10, A12 and A14 and has as control signals B0, B2, B4 and B6, C0 and C2 and D0. Similarly, multiplexer tree MB receives as inputs B0, B2 B4 and B6 and is controlled by C0, C2 and D0. In the same way, multiplexer MC receives as inputs C0 and C2 and is controlled by D0. Finally, the signal D0 is applied to the output terminal E3 instead of D1.

The OR-gate forming the fourth stage 16 of the OR-gate tree is provided for the sole purpose of producing an output on terminal E4 indicating that at least one of the bits applied to the input terminals A0, . . . , A15 is a "1". If that output is not required then not only can the single OR-gate of the fourth stage be omitted but so also can the rightmost OR-gate in each stage of the tree (for a leftmost "1" detector). For a rightmost "1" detector the leftmost OR-gates in each stage of the OR-gate tree can be omitted.

It will be apparent to those skilled in the art that the example of the apparatus described above with reference to FIG. 1 has a hierarchical configuration. That is also demonstrated by the table of signals in the OR-gate tree 11 shown in FIG. 3.

Utilising that hierarchical configuration similar circuits with a $2^N$-bit inputs and N-bit outputs where N is a positive integer (greater than or equal to two) can be constructed. Modified circuits for numbers of input bits not equal to a power of two can also be made using as a basis the construction of a circuit for the next higher power of two number of inputs and omitting superfluous OR-gates and multiplexers.

Figure 4:
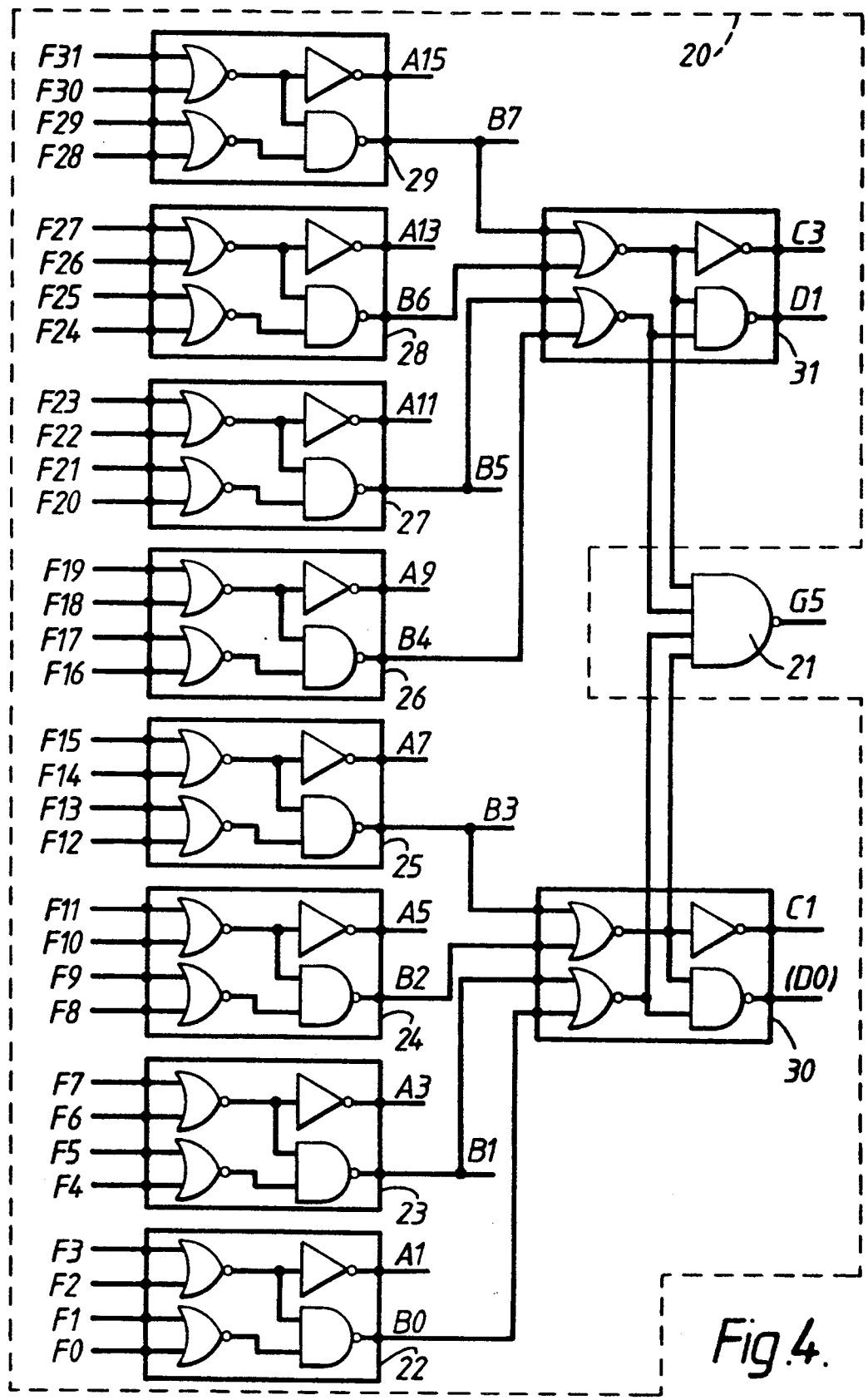
FIG. 4 is a diagram of the binary tree of "OR" gate means of a second example of the apparatus.
Figure 5:
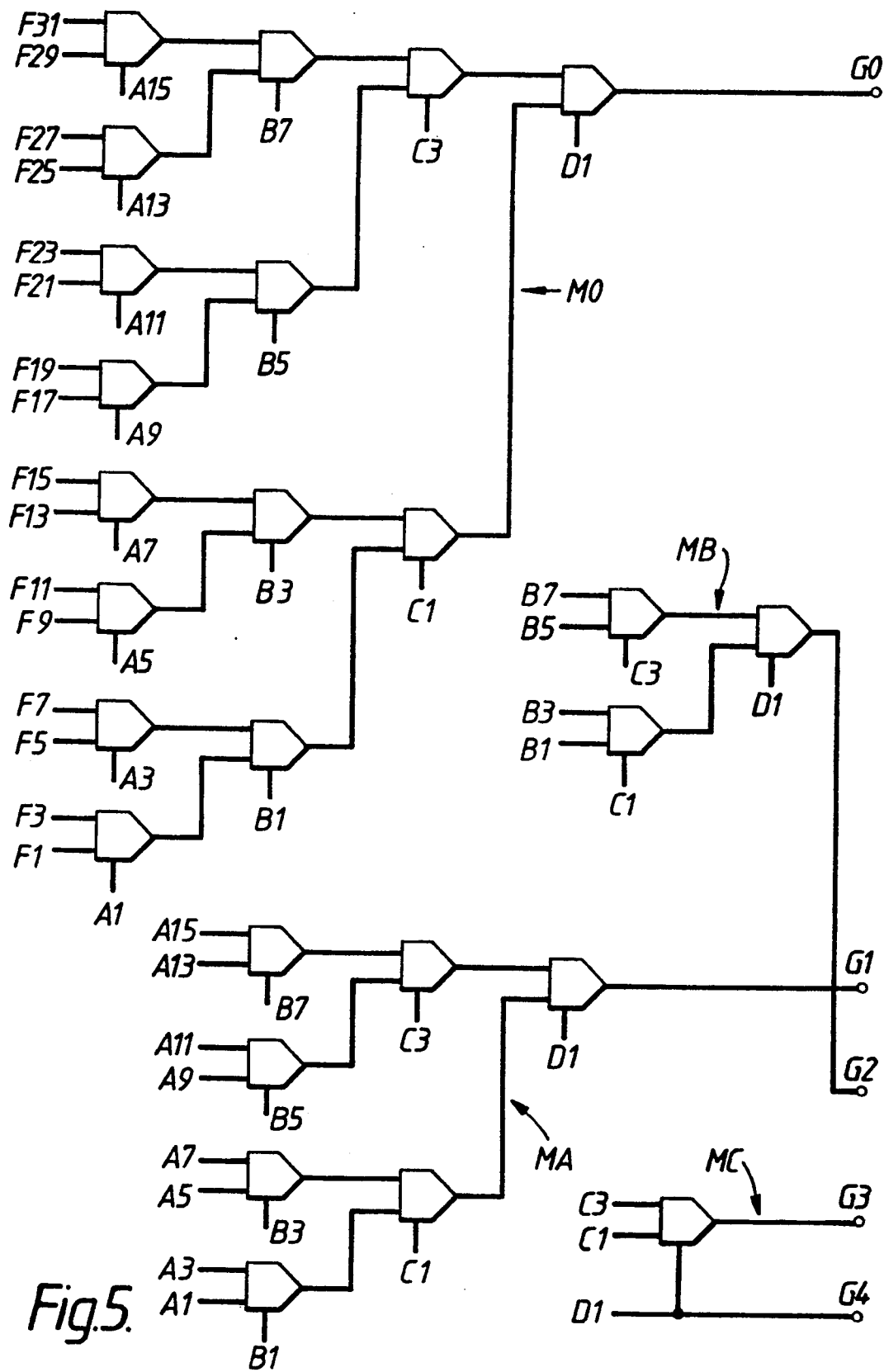
FIG. 5 is a diagram of the multiplex circuits of the second example.

An example of the apparatus for detecting the position of the leftmost "1" bit with N=5 is shown in FIGS. 4 and 5. FIG. 4 shows the circuit of the OR-gate tree and FIG. 5 the multiplexer circuit.

In FIG. 4, the OR-gates are replaced by logical equivalents using NOR-gates, NAND-gates and inverters. The first two stages of the tree 20 are formed by eight logical units 22, 23, . . . , 29, each containing two NOR-gates the outputs of which are connected to the inputs of a NAND-gate and the output of the left-hand NOR-gate is also connected to an inverter. Each unit has two outputs, one connected to the output of the NAND-gate and the other connected to the output of the inverter. Comparison of the circuit of FIG. 4 with that of FIG. 1, bearing in mind that FIG. 4 is constructed to handle a 32-bit input number where FIG. 1 is designed for a 16-bit input number, reveals that the 5 NOR-gates in the logical units form the first stage of the tree and the NAND-gates the second stage of that tree. The NAND-gate not only provides the logical OR function of the inverted outputs of the NOR-gates, but also reinverts the signal so that the combination acts as three OR-gates. The inverter is necessary to erect the output of the left-hand NOR-gate in each unit.

A 32-bit input number F0 ... F31 is applied to the inputs of the NOR-gates in the logical units 22 to 29. The outputs of the inverters of the units form the signals A1, A3, A5, A7, A9, A11, A13 and A15 respectively using the same nomenclature as is used in FIG. 1. The outputs of the NAND-gates respectively form the signals B0, B1, ..., B7, also corresponding to the nomenclature used in FIG. 1. The outputs B0, B1, B2 and B3 from the lower four units 22 to 25 are applied to a further logical unit 30 of the same construction, and the outputs B4, B5, B6 and B7 from the upper four logical units 26 to 29 are applied to the inputs of another logical unit 31 of the same construction. These latter units form the third and fourth stages of the tree 20 and logically correspond to stages 2 and 3 of FIG. 1. From the two units 30 and 31 the outputs from the inverters provide the signals C1 and C3 and the outputs from the NAND-gates form the signals D0 and D1. The fifth stage of the tree 20 is formed by a single four-input NAND-gate 21 connected to the outputs of the four NOR-gates in the two logical units 30 and 31. Instead of the four-input NAND-gate 21 connected as described, a two-input OR-gate (not shown) could be connected to the outputs D0 and D1 as in FIG. 1. The output of the four-input NAND-gate 21 provides the flag signal G5 indicating the presence of a "1" bit on at least one of the inputs F0 to F31.

The signals produced in the OR-gate tree 20 shown in FIG. 4 are applied as indicated to four multiplexer trees as shown in FIG. 5. The multiplexer trees MA, MB and MC correspond to the trees having the same references shown in FIG. 1 and have the same input signals as in that Figure. The fourth tree M0 is a four-stage tree of two-input multiplexers and has 16 inputs connected to the odd numbered bits of the input signals F0 to F31 and is controlled by the signals A, B, C and D produced by the OR-gate tree. The multiplexer tree M0 provides the bit G0 of the output code. The tree MA operates as described above with reference to FIG. 1 to provide the bit G1. Similarly, the tree MB provides the bit G2 and the tree MC provides the bit G3. As in FIG. 1, the signal D1 from the OR-gate tree provides the bit of the output code of highest significance, which is termed G4 in FIG. 5.

The operation of the apparatus shown in FIGS. 4 and 5 corresponds to that of the apparatus of FIG. 1 with the extra stage added to the OR-gate tree and the additional multiplexer tree M0 added to the multiplexer circuit.

Two different realisations of the OR-gate tree using different but logically equivalent elements are described above with reference to FIGS. 1 and 4. Other logical elements could be used to provide the OR-gate tree, possibly producing inverted signals with suitable modifications to the operation of the multiplexers in the multiplexer circuit to produce the effect of erect signals.

The multiplexers of the multiplexer circuit may conveniently be constructed using transmission gates formed of MOS transistors, two transmission gates to each multiplexer with the control signals to the two gates in a single multiplexer inverted with respect to one another so that for a given control signal one transmission gate is open and the other closed. Other forms of circuit could be used for the multiplexers, using CMOS gates and/or other logical elements or possibly logical elements with bipolar transistors. Preferably the circuits chosen have a short transmission time.

We claim:

1. Apparatus for detecting the "1" bit of an input binary number of n-bits having an extreme position in that number and for producing an output representing that position, the apparatus including a binary tree of two-input OR-gate means having m stages, where $2^m \geq n$, with or without the final stage of the tree containing a single OR-gate means, and having a first stage with up to $2^{m-1}$ OR-gate means to the inputs of which the bits of the input number are respectively applied, and a multiplexer circuit having m-2 multiplexer trees selectively responsive to inputs to and outputs from the stages of the binary tree to produce respective output bits which in combination with an output from the penultimate stage of the binary tree form a binary number representing the position of the extreme "1" bit in the input number.

2. Apparatus according to claim 1 including the final stage of the OR-gate binary tree and having an output terminal connected to the output of the single OR-gate means of the final stage, that output indicating that at least one "1" bit appears in the input binary number.

3. Apparatus according to claim 1 wherein the binary tree of OR-gate means comprises a plurality of OR-gates.

4. Apparatus according to claim 1 wherein alternate stages of the binary tree of OR-gate means comprise NOR-gates and intervening stages of that tree comprise NAND-gates.

5. Apparatus according to claim 4 wherein the alternate stages of the binary tree include one or more inverters for re-erecting the output signals of respective NOR-gates for application to the multiplexer circuit.

6. Apparatus according to claim 4 wherein the output signals from the NOR-gates in the alternate stages of the binary tree are applied directly to the multiplexer circuit, the multiplexer circuit being so constructed to use inverted signals from the alternate stages and erect signals from the intervening stages of the binary tree.

7. Apparatus according to claim 1 wherein the multiplexer trees are formed of one or more two-input multiplexers in one or more stages connected in cascade, the inputs to the multiplexers of the first stage of each tree are derived from input signals to OR-gate means in a stage of the binary tree respective to the particular multiplexer tree and control signals for the multiplexers of each tree are derived from the output signals of the OR-gate means in corresponding stages of the binary tree starting with the stage from whose input signals the input signals to the particular multiplexer tree are derived.

8. Apparatus according to claim 7 wherein the input and control signals of each multiplexer tree are derived from the same-handed ones of the signals taken in pairs of the binary tree of OR-gate means, the handedness of the signals being dependent on whether the position of the leftmost "1" bit or of the rightmost "1" bit of the input signal is to be identified.

9. Apparatus according to claim 1 wherein each multiplexer comprises two transmission gates connected from respective inputs to a common output, one of the transmission gates being capable of transmitting signals and the other not capable of transmitting signals, depending on a control signal.

* * * * *